S. Barnhart.
Saw Mill.
No. 96,868.
Patented Nov. 16, 1869.

Witnesses:
Inventor:
S. Barnhart

United States Patent Office.

SIMON BARNHART, OF CHILLICOTHE, OHIO.

Letters Patent No. 96,868, dated November 16, 1869.

IMPROVEMENT IN SAW-MILLS.

The Schedule referred to in these Letters Patent and making part of the same.

*To all whom it may concern:*

Be it known that I, SIMON BARNHART, of Chillicothe, in the county of Ross, and State of Ohio, have invented certain new and useful Improvements in Rip-Saw Mills; and I do hereby declare that the following is a full and exact description thereof.

My invention relates to the construction of the framing or table, and to certain appendages for supporting the ends of the plank or stuff being sawed.

I will first describe what I consider the best means of carrying out my invention, and will afterward designate the points which I believe to be new.

The accompanying drawings form a part of this specification.

Similar letters of reference indicate like parts in both figures.

Figure 1:
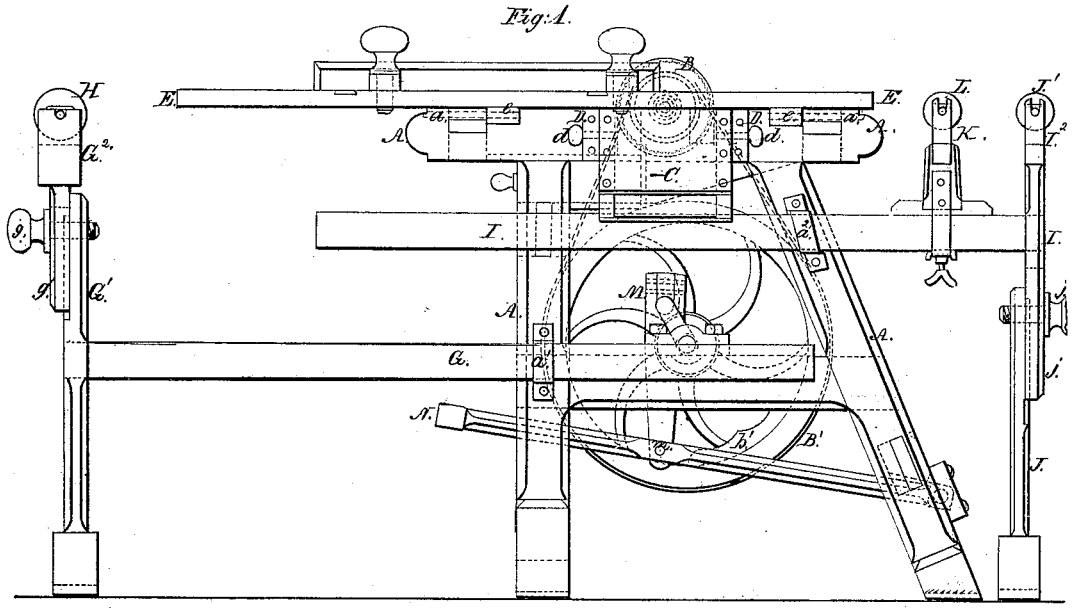
Figure 1 is a side elevation.
Figure 2:
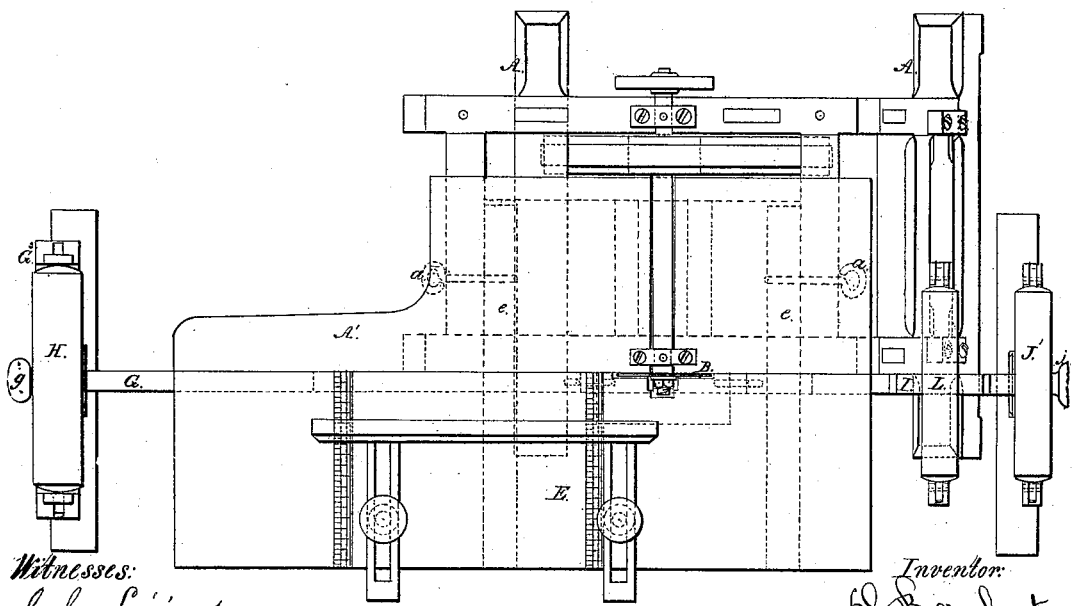
Figure 2 is a plan view of the entire machine, in condition for use.

A is the main frame-work of the machine.

The saw B is mounted in a shaft, supported in bearings in the frame A, and provided with efficient means of driving it.

C is a casing, which encloses the lower half of the saw, and takes the sawdust down into any suitable receptacle.

It is supported by pins $d\ d$, introduced through the brackets D, on the back side of the frame A.

When it is desired to remove the saw, the casing C is removed, by simply withdrawing the pins $d\ d$.

E is the rear portion of the table, beyond the saw.

It is supported by the cross-timbers $e$, which are supported in the frame A by the aid of the pins $a\ a$.

In removing or exchanging the saw, the rear portion E of the table is removed, by moving it bodily back, after having withdrawn the pins $a\ a$.

Referring to the figures, it will be understood that, in sawing, the lumber is fed from the left to the right.

G is a slide, adapted to move endwise within a strap, $a^1$, on the side of the frame A.

It is firmly fixed, at its outer end, to an upright framing, $G^1$, which, in turn, carries a stand, $G^2$, adjustable vertically by means of the set-screw $g$, which stands in a slot, $g'$, and secures it at various heights.

It supports a roller, H, which may thus be adjusted at greater or less distances from the saw, and level with the top of the table A, or at various distances above the table.

I is a corresponding slide, adapted to move in a corresponding strap, $a^2$.

It is connected, at its outer end, to the frame $I^1$, which is thus movable out and in, so as to increase or diminish the distance from the saw.

The upper portion $I^2$ is raised and lowered on the lower portion J, and adjusted at various levels by the aid of the set-screw $j$, which stands in the slot $j'$.

The upper framing $I^2$ supports a roller, $J'$, which is thus adjustable out and in from the saw, and also up and down from the table.

There is a frame, K, which is also adjustable out and in on the bar I, and carries a roller, L.

These rollers H, I, and L, serve a very important purpose in sawing material which is curved.

By adjusting the rollers at a proper height and distance, I can adapt my machine to sawing stuff that is variously curved.

They perform, also, an important function in sawing lumber which is naturally straight, but is so thin as to be very easily bent by its own weight. The rollers may support the overhanging ends, and allow them to lay flat on the table.

In sawing most flexible material, however, I prefer to set the rollers a little higher than the table. The amount of such excess in height depends on the thinness and flexibility of the material to be used.

I set the rollers at such height that they will hold the lumber entirely clear of the table, except where it is drawn down by the action of the saw, or by the hands of the attendant, or both.

These rollers, and the adjustable frames which support them, greatly facilitate the adjustment of the mill to be used out of doors, on any uneven surface, the rollers being raised or lowered to suit the place where the mill stands.

When they are not needed, they can be drawn in, or slipped back under the machine, so that they are out of the way.

The entire machine is very easily taken apart and moved, and again set up for operation. The machine can be taken apart and again made ready for operation in two minutes.

The wheel B' is hung on the side of the machine, opposite from the table, and thus tends to balance the machine, and avoid the necessity for any prop or leg under the table.

I employ the balance-weight $b'$, placed, as represented, on the wheel B'. This tends to always turn the wheel so as to bring its weight to the extreme lowermost position.

In such position, the pitman M stands a little inclined, being connected to the treadle N by the pin $m$, a little nearer the foot, so that it is certain to draw in that direction, and turn the wheel toward the operator. The wheel cannot, under these conditions, start wrong.

Putting the foot on the treadle, with the machine at rest, it will always start by turning toward the operator, which is the right direction.

I claim—

1. The removable parts C and D, arranged relatively to each other, and to the frame A and saw B, as and for the purposes herein set forth.

2. In combination with a portable saw-mill, A B, substantially of the character herein described, the end-supports H' and J', with means, as specified, for adjusting them, not only outwardly and inwardly, but up and down, at will, substantially as and for the purposes herein set forth.

In testimony whereof, I have hereunto set my name, in presence of two subscribing witnesses.

SIMON BARNHART.

Witnesses:
AARON ELLIOTT,
JOHN HILTON.